United States Patent [19]
Hart et al.

[11] 3,868,422
[45] Feb. 25, 1975

[54] MULTISTAGE HYDROFORMYLATION PROCESS

[75] Inventors: Wallace F. Hart; Hugh J. Hagemeyer, Jr.; William R. Park, all of Longview, Tex.

[73] Assignee: Eastman Kodak Company, Rochester, N.Y.

[22] Filed: Dec. 23, 1971

[21] Appl. No.: 211,610

[52] U.S. Cl. ................................ 260/604 HF
[51] Int. Cl. ................................. C07c 45/02
[58] Field of Search ...................... 260/604 HF

[56] References Cited
UNITED STATES PATENTS
2,811,567  10/1957  Mason ................... 260/604 HF Primary Examiner—Bernard Helfin
Assistant Examiner—A. Siegel
Attorney, Agent, or Firm—George P. Chandler; Daniel B. Reece, III

[57] ABSTRACT

A hydroformylation process which insures the uniform distribution of active catalyst, reaction and temperatures is provided by passing olefinic hydrocarbons and a hydroformylation catalyst through multistage reaction zones. Concurrently, a stream of heated synthesis gas is passed countercurrent to the flow of the olefinic hydrocarbons through the plurality of reaction zones. Hydroformylation reaction products are removed from the last reaction zone and passed through a stripper countercurrent to the flow of the synthesis gas being fed into the multistage reactor via the stripper. Thus, any volatile constituents, including any catalyst residue, which are entrapped in the hydroformylation products are removed therefrom by the counterflow of the heated synthesis gas within the stripper and returned with the synthesis gas to the multistage reactor. The excess synthesis gas removed from the multistage reactor is passed through an absorber countercurrent to the olefinic hydrocarbon feed stream that is being fed into the first reactor zone. Any volatile catalyst constituent entrained in the excess synthesis gas is thus scrubbed therefrom and returned to the multistage reactor by the incoming olefinic feed.

11 Claims, 1 Drawing Figure

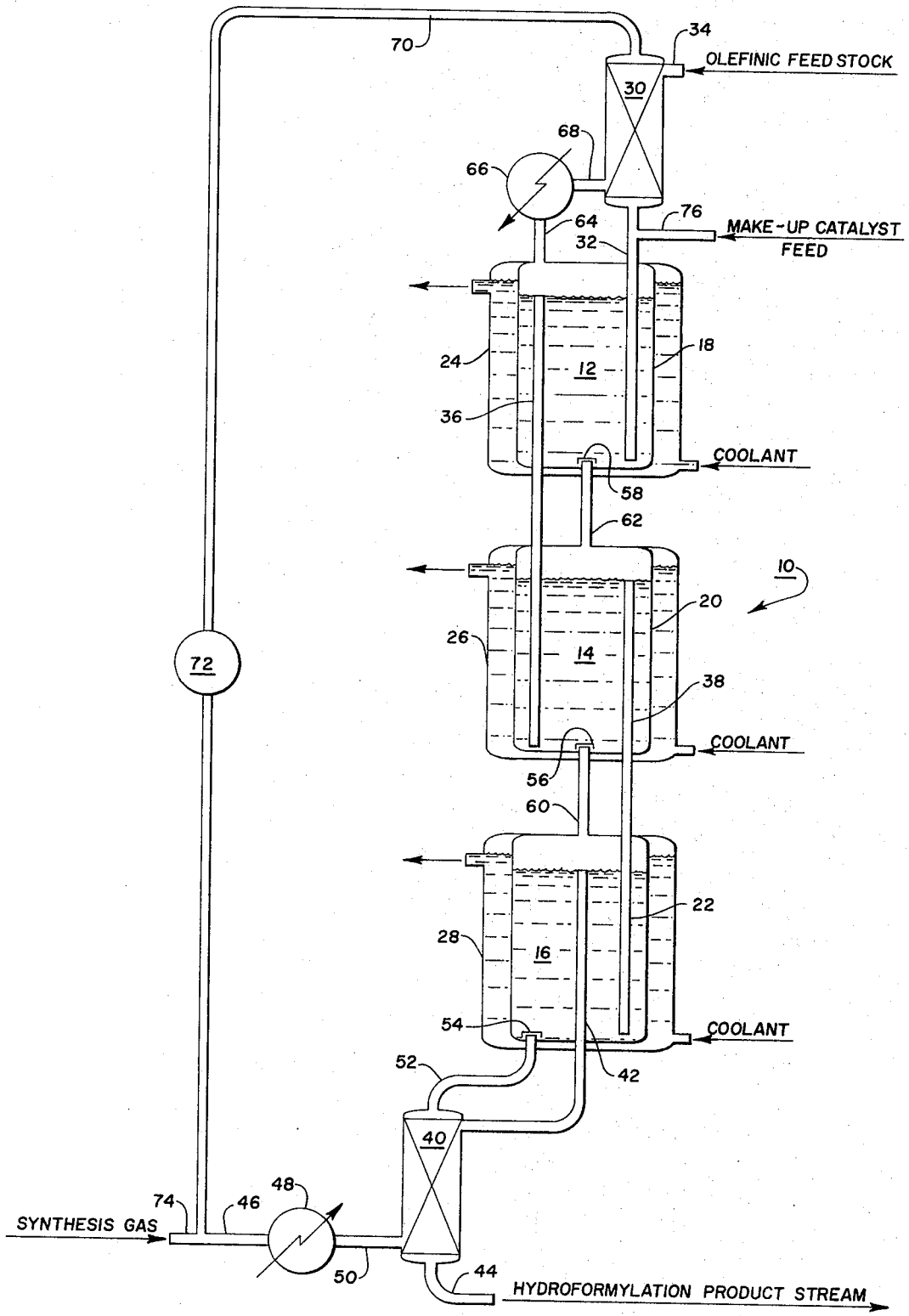

MULTISTAGE HYDROFORMYLATION PROCESS

This invention relates to a continuous process for the preparation of oxygenated organic compounds by the reaction of carbon monoxide and hydrogen with carbon compounds containing olefinic linkages in the presence of a carbonylation catalyst in a multistage reactor. More particularly, this invention relates to a continuous multistage hydroformylation process employing an improved catalyst cycle which maintains a uniform distribution of active catalyst, temperatures and reaction throughout the reactor zones, thereby insuring essentially complete conversion of the olefinic compounds in a single pass through the multistage reactor with maximum utilization of the catalyst while maximizing the yield to hydroformylation products.

It is well known in the art that oxygenated organic compounds may be synthesized from organic compounds containing olefinic linkages by a reaction with carbon monoxide and hydroxide in the presence of a catalyst containing metals of the iron group such as cobalt or iron, preferably the former, in an essentially three-step process. In the first or hydroformylation step the olefinic material, catalyst and proper proportions of $CO$ and $H_2$ are reacted to give a product consisting predominantly of aldehydes containing one more carbon atom than the reacted olefin. This oxygenated organic mixture, which contains dissolved in it compounds such as the carbonyls and the molecular complexes of the metal catalysts, is treated in the second step to cause removal of soluble metal compounds from the organic material in a catalyst removal zone. The catalyst-free material is then generally hydrogenated to the corresponding alcohols or it may be oxidized to the corresponding acids.

Although this carbonylation or oxo reaction by which name this process is generally known, provides a usable method for the preparation of alcohols and acids, it leaves much to be desired from a commercial standpoint. For example, in the first or hydroformylation step, it is highly desirable to obtain complete conversion of the olefinic compound to simplify the recovery and purification of the product and lower production costs. Complete conversion in a single pass through the reaction zone avoids the costly or impossible separation problems which exist due to an overlap in boiling points between the high ends of the feed reactants and the low ends of the hydroformylation products. In addition, with feed compounds such as unsaturated esters, the formation of polymers in the purification step is also avoided when high conversion to the formyl ester is obtained in the hydroformylation step.

To achieve high conversions in the first step of the oxo process it has been suggested that a multistage reactor be employed. However, it has heretofore been found that a multistage reactor cannot be readily adaptable for use in the hydroformylation step due to the facts that: (1) the catalyst concentration cannot be evenly distributed and controlled throughout each reactor zone; (2) the reaction rate cannot be evenly distributed between each reactor zone; and (3) a uniform temperature cannot be maintained between each reactor zone. In addition, the higher rate of catalyst feed required to maintain acceptable catalyst levels in the second, third and fourth stages of the multistage reactor has increased production costs and given rise to contamination problems in the process equipment, final hydroformylation product, etc.

Thus, a need exists for a multistage hydroformylation process which maintains a uniform distribution of active catalyst, even distribution of the reaction and uniform temperataures in the reactor zones thereby insuring essentially complete conversion of the olefinic compounds in a single pass through the multistage reactor with a maximum yield of desired hydroformylation product. The need also exists for an improved catalyst cycle which will substantially reduce or completely eliminate the loss of the catalyst material from the multistage reactor thereby increasing the operating efficiency of the process while also reducing the contamination problem.

Accordingly, an object of this invention is to provide a multistage hydroformylation process which maintains uniform distribution of active catalyst, reaction and temperatures in the reactor zones.

Another object of this invention is to provide a new catalyst cycle for a multistage hydroformylation process which insures maximum utilization of the catalyst.

Yet another object of this invention is to provide a catalyst recovery and recycle system for a multistage hydroformylation process which substantially reduces the loss of catalyst from the reactor zones and thus eliminates catalyst contamination of the process and products.

These and other objects and advantages of this invention will become apparent in view of the following description and appended claims.

In accordance with the present invention, it has been found that a multistage hydroformylation process can be produced which will insure a uniform distribution of active catalyst, even distribution of the reaction and uniform temperatures in the reaction zones. This process involves passing olefinic hydrocarbons and a hydroformylation catalyst through at least three, and preferably between four to 10, reactors which are connected in cascade to form multistage reaction zones. Concurrently, a stream of heated synthesis gas (i.e., hydrogen and carbon monoxide) is passed countercurrent to the flow of the olefinic hydrocarbons through the plurality of reaction zones. Hydroformylation reaction products, comprising aldehydes and alcohols, and residual amounts of the catalyst are removed from the last reaction zone and passed through a stripper countercurrent to the flow of the synthesis gas that is being fed into the multistage reactor via the stripper. Thus, any volatile constituents, including the catalyst residue, which are entrapped or absorbed in the hydroformylation products are removed therefrom by the counter-flow of the heated synthesis gas within the stripper and are returned with the synthesis gas to the multistage reactor. The excess of unreacted synthesis gas which is removed from the multistage reactor is passed through an absorber countercurrent to the olefinic hydrocarbon feed stream that is being fed into the first reactor zone. Any volatile catalyst constituent which may be entrained or otherwise carried in the excess synthesis gas is thus scrubbed therefrom and returned to the multistage reactor by the incoming olefinic feed.

The present invention will be more readily understood by referring to the detailed description presented hereinafter wherein reference will be made to the accompanying drawing which is a schematic illustration of a system suitable for carrying out a preferred embodiment of the invention.

Referring now to the drawing, a multistage reactor designated generally by the numeral 10 is shown which consists of three separate reaction zones 12–16 although any number between three and about 18 may be used to insure the substantially complete conversion of an olefinic feed stock into a desired hydroformylation product. However, it is necessary that no less than three such reaction zones be employed in a cascade arrangement to insure conversions of greater than 90 percent of the olefinic feed stock to the desired hydroformylation product on a single pass through the reactor. Each reaction zone consists of an enclosed pressure reactor vessel 18–22 which is capable of withstanding the pressures involved in holding the olefinic feed stock in a liquid state under hydroformylation conditions. Various methods for the removal of the heat generated during the reaction can be used with this particular illustration showing the use of liquid jackets 24–28 which substantially enclose each reaction zone and through which a coolant such as water is circulated. In some instances it may be desirable to use a separate jacket on the first reaction zone 12 and a single jacket around all of the remaining reaction zones.

An absorber 30 is positioned ahead of the first reaction zone 12 and is connected thereto by a conduit 32 which extends through the walls of the reactor vessel and terminates near the bottom thereof to form a dip pipe. The olefinic feed stock for the multistage reactor is fed through a conduit 34 into the top of the absorber. The olefinic feed, which is in a liquid form, thus flows through the absorber 30 and into the bottom of the first reaction zone 12. The olefinic feed then flows from the top of the first reactor zone through a conduit 36 to the bottom of the second reactor zone 14 and from the top of this reactor zone through a third conduit 38 to the bottom of reactor zone 16. In this manner the liquid olefinic feed to each stage enters through a dip pipe near the bottom of the stage and exits from each stage through an overflow line or weir located near the top of the stage.

A stripper 40 is connected to the last or bottom reactor vessel 16 through a conduit 42 so that the hydroformylation product from the vessel flows from near the top thereof into the top of the stripper. An outlet conduit 44 is provided in the bottom of the stripper from which the finished hydroformylation product is removed from the reaction system. If desirable, the stripper can be packed with Berl saddles or may contain bubble caps or sieves.

Synthesis gas for the reactor is fed into the bottom of the stripper 40 through a conduit 46, heater means 48 and input conduit 50. The synthesis gas which has been heated to a temperature of between about 100°C. and about 200°C. as it passed through the heater means 48 then flows up through the stripper 40 and from the top thereof into the bottom of the last reactor vessel 16 via conduit 52. As the hot synthesis gas flows countercurrent to the hydroformylation product passing through the stripper 40 it strips any volatile products including any catalyst compounds from the product and returns them to the reactor vessel 16. Thus, the hydroformylation product leaving the stripper through outlet conduit 44 has removed therefrom substantially all of the volatile products including any catalyst residue that would otherwise remain entrapped in the product.

From the conduit 52 the synthesis gas flows through a series of bubble caps 54–58 and connecting conduits 60–62 up through each reaction zone. By this arrangement the synthesis gas flow may be adjusted to provide the degree of turbulence required for good heat transfer and mixing in the reaction zone. The exit gas from the reactor zone, which is mainly synthesis gas, is removed from the top of the first reactor vessel 12 through a conduit 64. After being passed through a heat exchanger 66 where its temperature is lowered to a desired level, which is usually between about 100°C. to about 200°C., the synthesis gas is fed by conduit 68 into the bottom of absorber 30. The exit gas is permitted to flow up through the absorber 30 countercurrent to the flow of olefinic feed stock and in this manner strips out any volatile or entrained catalyst residue contained in the gas and returns it to the first reaction zone.

The exit gas which has been stripped of any volatile or entrained catalyst residue is removed from the top of the absorber 30 by conduit 70 and returned through a circulator pump means 72 to the conduit 46. Make-up synthesis gas is also fed to conduit 46 from a suitable supply source (not shown) through a conduit 74.

Make-up catalyst can be fed into the multistage reactor as a solution in the olefinic feed stock through conduit 34. However, it is preferred that the make-up catalyst be fed into the conduit 32 at 76 so that the olefinic feed stock entering the top of absorber 30 is free of any catalyst and thus can more readily absorb any catalyst residue present in the exit gas. When the make-up catalyst is fed into the reactor through conduit 76, it is preferably in the form of a salt of an organic acid dissolved in a small amount of the olefinic feed stock or an alcohol.

Any olefin or mixture of olefins can be employed in the hydroformylation reaction, but preferred results from a commercial viewpoint are obtained when the olefins contain at least about 6 carbon atoms, and especially preferred results are obtained when the olefins contain about 7 to about 10 carbon atoms. By the term "olefin" as used herein and in the appended claims is meant the open chain as well as the cyclic olefins. Comprised in the suitable olefins used as starting materials are: cyclohexane, 3-methyl-cyclohexene, etc. These compounds and their various homologues and analogues may be substituted in the nucleus and/or in the substituents in various degrees by straight chain alicyclic and/or heterocyclic radicals. The charge to the process of this invention may comprise a mixture of two or more of such olefins.

A salt of a catalytic metal, such as cobalt or rhodium, which under the conditions of the process is soluble in the olefin charge is the type of catalyst preferred for this hydroformylation reaction. When the catalytic metal salt is a salt of cobalt, preferred results are obtained when the hydroformylation temperatures are selected from the range of about 150°C. to about 175°C. The actual temperature selected will depend upon charge stock and carbon monoxide partial pressure. Generally the other variables are adjusted so that a temperature in the range of about 100°C. to about 200°C. can be employed. In this way, the catalytic metal is readily introduced into the reaction zone and the salt is rapidly converted to an active form which is believed to be a metal carbonyl. Although both rhodium and cobalt salts can be used in this process, cobalt salts are the least expensive and for this reason the following examples are largely concerned with a process in which the catalytic metal is cobalt. Since it has been reasonably well substantiated that the active species of the catalyst is probably a hydrocarbonyl of cobalt, dicobalt octacarbonyl, cobalt naphthenate and cobalt hydrocarbonyl are the preferred catalyst although any precursor that will furnish cobalt in an active form may be used.

While any suitable hydroformylation temperature within the range discussed hereinabove can be employed in the practice of this invention, it has been found that the temperature throughout the multistage reaction zones must not vary more than about 10°C. if best results are to be obtained. In addition, it has been found that the temperature between any two adjacent reaction zones should not vary more than about 4°C. and preferably not over 2°C. The pressure employed in the reaction zones will depend in some measure upon the charge stock employed and the other variables of the process, but normally falls within the range of from about 1000 to about 6000 pounds per square inch gauge.

The composition of the synthesis gas (i.e., carbon monoxide and hydrogen) employed in the hydroformylation reaction zone to produce the desired aldehyde product can be varied within wide ranges. The hydrogen to carbon monoxide mole ratio can vary from about 0.5:1 to about 8:1, but in general preferred results are obtained with a mole ratio in the range of about 1:1 to about 4:1. Within this range the mixture of gases or synthesis gas can be economically produced and at the same time the gases discharged from the hydroformylation unit can be readily recycled in accordance with this invention.

The process of the present invention may be further illustrated by the following examples.

EXAMPLE 1

A liquid olefinic feed stock consisting of an alphaolefin mixture having 7 to 9 carbon atoms is fed to the top of an absorber of a four stage multistage reactor of the type discussed hereinabove. The feed rate of the $C_7$—$C_9$ alpha-olefin mixture is adjusted to 9.55 pounds per hour. Two weight percent of a cobalt naphthenate catalyst dispersed in normal butanol is fed to the multistage reactor at the rate of 1.66 pounds per hour. Thus, the cobalt concentration is 0.297 percent by weight of the combined olefin and alcohol feed. The flow of synthesis gas is adjusted to maintain a rate of approximately 20 standard cubic feet per minute per pound per hour olefin feed and to maintain an operating pressure of approximately 2000 pound pressure per square inch gauge. At these conditions the amount of exit gas being recirculated is between about 1 to about 10 standard cubic feet per minute per pound per hour olefin feed.

In this example the synthesis gas is fed directly into the bottom of the last reactor stage thereby bypassing the stripper unit, and the exit gas is taken from the first reactor stage and fed directly to the circulator pump thereby bypassing the absorber unit. Thus, no stripper or absorber unit is employed. Table I sets forth certain of the operating conditions which are found to exist in the multistage reactor under these conditions.

TABLE I

| Stage No. | Temp. °C. | Wt. % of Catalyst as $Co(CO)_4$ | Wt. % Olefin |
|---|---|---|---|
| 1 | 163 | 0.310 | 28.2 |
| 2 | 156 | 0.099 | 10.8 |
| 3 | 152 | 0.079 | 3.9 |
| 4 | 150 | 0.091 | 2.6 |

Olefin conversion to the hydroformylation product is about 92 percent and the ratio of $C_8$—$C_{10}$ aldehydes to $C_8$—$C_{10}$ alcohols in the product is about 4.2:1. The yield of hydroformylation product per pound of cobalt per pass through the multistage reactor is approximately 300 pounds.

As is apparent from Table I, the reaction temperatures between stages vary considerably and the temperature spread from the first to last reactor stage exceeds 10°C. The distribution of catalyst in each stage is very poor and the unreacted olefin feed stock is not well distributed between stages. Also, the ratio of desired aldehydes to undesired alcohols is low.

In addition, after a relatively short period of time the circulator pump and associated lines of the reactor become contaminated with catalyst residue as does the output conduits through which the hydroformylation product is being carried. This results in the reactor having to be shut down to remove the plated out catalyst residue. The hydroformylation product also contains an excessive amount of catalyst residue. Thus, this reactor system is not commercially attractive.

EXAMPLE 2

The process of Example 1 is repeated except that the exit gas from the first reactor stage is fed through the absorber. Thus, this example employs an absorber unit but not a stripper unit. Table II sets forth certain of the operating conditions which are found to exist in the multistage reactor under these conditions.

TABLE II

| Stage No. | Temp., °C. | Wt. % of Catalyst as $Co(CO)_4$ | Wt. % Unreacted Olefin |
|---|---|---|---|
| 1 | 157 | 0.297 | 27.2 |
| 2 | 155 | 0.097 | 11.5 |
| 3 | 152 | 0.077 | 3.7 |
| 4 | 150 | 0.091 | 2.6 |

The olefin conversion to hydroformylated products is about 97.4 percent and the ratio of $C_8$—$C_{10}$ aldehydes to $C_8$—$C_{10}$ alcohols in the product is about 4.8:1. The yield of hydroformylation products per pound of cobalt per pass is approximately 365 pounds. The absorber is found to be effective in preventing catalyst residue from contaminating the circulator pump and increasing the yield of product per pound of catalyst by a small amount. Otherwise, no appreciable improvement is noted in the operation of a multistage reactor of this type and it too is not commercially attractive.

EXAMPLE 3

The process of Example 1 is repeated except that the synthesis gas is fed through the stripper. Thus, this example employs a stripper unit but not an absorber unit. Table III sets forth certain of the operating conditions which are found to exist in the multistage reactor under these conditions.

TABLE III

| Stage No. | Temp., °C. | Wt. % of Catalyst as Co(CO)$_4$ | Wt. % Unreacted Olefin |
| --- | --- | --- | --- |
| 1 | 161 | 0.296 | 27.5 |
| 2 | 153 | 0.097 | 10.8 |
| 3 | 152 | 0.080 | 3.9 |
| 4 | 150 | 0.120 | 2.6 |

The olefin conversion to hydroformylated products is about 96 percent and the ratio of $C_8$—$C_{10}$ aldehydes to $C_8$—$C_{10}$ alcohols in the product is about 5:1. The yield of hydroformylation product per pound of cobalt per pass is approximately 360 pounds. The use of a stripper unit is found to be effective in eliminating substantially all of the volatile residual cobalt catalyst from the hydroformylation product stream. Thus, other than serving to clean up the hydroformylation product stream, the use of a stripper unit has very little effect upon the operation of a multistage reactor system of this type.

EXAMPLE 4

The process of Example 1 is repeated except that the exit gas from the first reactor is fed through the absorber and the synthesis gas is fed through the stripper. Thus, this example employs both a stripper and absorber unit in accordance with this invention. Also, only one weight percent cobalt naphthenate in normal butanol is fed to the multistage reactor at a rate of 0.83 pounds per hour. Table IV sets forth certain of the operating conditions which are found to exist in the multistage reactor under these conditions.

TABLE IV

| Stage No. | Temp., °C. | Wt. % of Catalyst as Co(CO)$_4$ | Wt. % Unreacted Olefin |
| --- | --- | --- | --- |
| 1 | 154 | 0.065 | 40.0 |
| 2 | 153 | 0.088 | 21.3 |
| 3 | 152 | 0.064 | 7.9 |
| 4 | 150 | 0.056 | 2.9 |

The olefin conversion to hydroformylated products is about 97.2 percent and the ratio of $C_8$—$C_{10}$ aldehydes to $C_8$—$C_{10}$ alcohols in the product is about 13.1:1. The yield of hydroformylated product per pound of cobalt per pass is approximately 1015 pounds.

EXAMPLE 5

The process of Example 4 is repeated except that the liquid olefinic feed stock is ethyl crotonate which contains 0.2 weight percent of cobalt naphthenate. The ethyl crotonate containing the cobalt naphthenate catalyst is fed to the top of the absorber at the rate of 12.5 pounds per hour and the operating pressure of the reactor is raised to 3000 pounds per square inch gauge. Table V sets forth certain of the operating conditions which are found to exist in the multistage reactor under these conditions.

TABLE V

| Stage No. | Temp., °C. | Wt. % of Catalyst as Co(CO)$_4$ | Wt. % Unreacted ethyl crotonate |
| --- | --- | --- | --- |
| 1 | 151 | 0.051 | 53 |
| 2 | 150 | 0.053 | 27 |
| 3 | 150 | 0.049 | 9.1 |
| 4 | 150 | 0.052 | 1.9 |

The yield to gamma formyl ethyl butyrate is about 91 percent.

From the above examples it can be seen that the process of this invention essentially eliminates the catalyst concentration gradient from the first to the last stage of the multistage reactor. In particular, high catalyst concentrations in the first stage are eliminated so that runaway reaction and localized over-heating is avoided. It was most unexpected to find that this process eliminated the catalyst concentration gradient and evenly distributed the reaction between the various stages of the multistage reactor. In addition, this process gives better control of the reaction, increases the yield to aldehyde products, gives aldehyde-to-catalyst yields per pass of three to four times greater than prior known processes and reduces the cobalt feed requirements by a factor of at least three.

In addition, the scrubbing out of the volatile catalyst compounds in the exit gas from the reactor and stripping the volatile catalyst compounds from the hydroformylation product under synthesis pressure keeps the catalyst out of the exchangers, lines and compressor in the recycle system and thereby eliminates plate-out problems in these areas. The successful use of a multistage reactor is also important in that a high conversion of an olefinic feed stock to a hydroformylation product in a single pass avoids the separation problems normally encountered where conversion is not accomplished and recycling of the unreacted feed stock is required. In addition, with feed compounds such as unsaturated esters, the formation of polymers during the subsequent refining step is avoided by the high conversion of the olefinic feed stock to the formyl ester afforded by this process.

The invention has been described in detail with particular reference to certain preferred embodiments thereof, but it will be understood that variations and modifications can be effected within the spirit and scope of the invention as described hereinabove.

We claim:

1. In a continuous hydroformylation reaction wherein liquid olefinic carbon compounds are contacted with synthesis gas comprising hydrogen and carbon monoxide, in the presence of a hydroformylation catalyst at elevated temperatures and pressures within a multistage reactor having at least three reaction zones connected in series to produce aldehydes and wherein a solution comprising said aldehyde and dissolved hydroformylation catalyst is removed from said multistage reactor, an improved process for retaining hydroformylation catalysts selected from the group consisting of cobalt carbonyls and cobalt hydrocarbonyls, in said multistage reactor while simultaneously improving the distribution of the reaction within said multistage reactor and preventing the temperature variation between adjacent reaction zones from exceeding about 4°C. and the temperature variation within said multistage reactor from exceeding about 10°C. which comprises passing the liquid olefinic carbon compounds through an absorber zone removing exit gas from the first stage of said multistage reactor, passing said exit gas through said absorber zone countercurrent to the flow of said liquid olefinic carbon compounds, whereby any hydroformylation catalyst present in said exit gas is absorbed by said olefinic carbon compounds feeding said olefinic carbon compounds to the first stage of said multistage reactor, recycling the gaseous effluent from said absorber zone to the last stage of said multistage reactor, removing said solution comprising said aldehyde product and dissolved hydroformylation catalyst from the last stage of said multistage reactor, passing said solution comprising said aldehyde product and dissolved hydroformylation catalyst through a scrubbing zone, passing at least a portion of the synthesis gas through said scrubbing zone countercurrent to said solution whereby any volatile hydroformylation catalyst present in said solution is intrained in said synthesis gas, passing said synthesis gas to the last stage of said multistage reactor, and withdrawing an aldehyde product substantially depleted of volatile hydroformylation catalyst from said scrubbing zone.

2. The process of claim 1 wherein said olefinic carbon compounds are selected from the group comprising olefins having from 6 to 10 carbon atoms.

3. The process according to claim 2 wherein the reaction temperature within said multistage reactor is from between about 100°C. to about 200°C. and the pressure is from between about 1000 to about 6000 pounds per square inch.

4. The process according to claim 3 wherein the synthesis gas comprises hydrogen and carbon monoxide in the ratio of between about 1:1 to about 4:1.

5. The process according to claim 1 wherein the synthesis gas passing through said scrubber zone is fed into the last reaction zone in said multistage reactor.

6. The process according to claim 5 wherein the reactor zones comprise pressure vessels through which said synthesis gas passes countercurrent to the flow of said olefinic carbon compounds.

7. The process according to claim 6 wherein the exit gas is fed under pressure to said last reaction zone.

8. The process according to claim 7 wherein the synthesis gas is heated prior to entering said scrubbing zone.

9. The process according to claim 8 wherein the exit gas is cooled prior to entering said absorber zone.

10. The process according to claim 9 wherein said multistage reactor has between 3 to 10 reaction zones connected in series.

11. The process according to claim 10 wherein each reaction zone is provided with means for removing at least a portion of the heat of reaction.

* * * * *